United States Patent

Du et al.

(10) Patent No.: US 9,238,781 B2
(45) Date of Patent: Jan. 19, 2016

(54) SYSTEMS AND METHODS FOR LIQUID FUEL DESULFURIZATION

(75) Inventors: Yanhai Du, Irmo, SC (US); Ken Reifsnider, Columbia, SC (US)

(73) Assignee: University of South Carolina, Columbia, SC (US)

( * ) Notice: Subject to any disclaimer, the term of this patent is extended or adjusted under 35 U.S.C. 154(b) by 514 days.

(21) Appl. No.: 13/603,834

(22) Filed: Sep. 5, 2012

(65) Prior Publication Data

US 2014/0061098 A1    Mar. 6, 2014

(51) Int. Cl.
*B01J 8/02* (2006.01)
*C10G 25/00* (2006.01)
*C10G 53/08* (2006.01)
*B01J 19/24* (2006.01)
*C10G 31/06* (2006.01)

(52) U.S. Cl.
CPC .............. *C10G 53/08* (2013.01); *B01J 8/0235* (2013.01); *B01J 8/0271* (2013.01); *B01J 19/243* (2013.01); *C10G 25/003* (2013.01); *C10G 31/06* (2013.01); *B01J 2208/0084* (2013.01); *B01J 2208/00398* (2013.01); *B01J 2219/00772* (2013.01); *C10G 2300/202* (2013.01); *C10G 2400/08* (2013.01)

(58) Field of Classification Search
None
See application file for complete search history.

(56) References Cited

U.S. PATENT DOCUMENTS

| | | | | |
|---|---|---|---|---|
| 2,989,383 | A * | 6/1961 | Miller | 422/200 |
| 3,471,131 | A * | 10/1969 | Rupprecht et al. | 366/305 |
| 4,237,620 | A * | 12/1980 | Black | 34/72 |
| 5,037,450 | A | 8/1991 | Keener et al. | |
| 5,124,140 | A * | 6/1992 | Okada et al. | 423/650 |
| 5,482,685 | A * | 1/1996 | Fujita et al. | 422/174 |
| 6,641,625 | B1 | 11/2003 | Clawson et al. | |
| 7,303,598 | B1 | 12/2007 | Namazian et al. | |
| 7,309,416 | B2 | 12/2007 | Fokema et al. | |
| 8,182,959 | B2 | 5/2012 | Du et al. | |
| 2001/0029311 | A1 | 10/2001 | Khare | |
| 2005/0236334 | A1 | 10/2005 | Rohrbach et al. | |
| 2012/0018351 | A1 | 1/2012 | Tatarchuk et al. | |

FOREIGN PATENT DOCUMENTS

| | | | |
|---|---|---|---|
| EP | 1481725 A1 | * | 12/2004 |
| WO | WO 00/66487 | | 11/2000 |
| WO | WO 02/47186 | | 6/2002 |
| WO | WO 2009107362 A1 | * | 9/2009 |

* cited by examiner

*Primary Examiner* — Jennifer A Leung

(57) ABSTRACT

In one aspect, the present subject matter is directed to a system for removing sulfur from liquid hydrocarbon fuel. The system includes a reactor having a fuel inlet and fuel outlet. The fuel inlet and fuel outlet are in fluid communication with a fuel path passing through the reactor. The fuel path is defined by an inner helical thread portion and an outer helical thread portion. The inner helical thread portion is complimentary with and has a smaller diameter than the outer helical thread portion. The inner helical thread portion surrounds a heating element and the outer helical thread portion is surrounded by an outer cover.

20 Claims, 4 Drawing Sheets

SYSTEMS AND METHODS FOR LIQUID FUEL DESULFURIZATION

GOVERNMENT SUPPORT CLAUSE

This invention was made with government support under W911NF-10-1-0460 awarded by Defense Advanced Research Projects Agency. The government has certain rights in the invention.

BACKGROUND

For fuel cell power generators employed in military field deployment, the use of logistic fuels (such as diesel, JP-5, JP-8, and the like) as the primary energy source is highly desired due to the high energy densities, economics and wide availability of these fuels. However, these fuels typically contain high concentrations of sulfur compounds (up to 3000 ppm according to the MIL-DTL-83133G) and, if not removed, they can cause severe poisoning and deactivation to solid oxide fuel cell (SOFC) anodes, as well as fuel reformers. Sulfur exists in these fuels as various compounds. These include sulfides, dimethylbenzothiophene, trimethylbenzothiophene, mercanptans, thiols, thiophenes, alkyl-substituted benzothiophenes (BT) and dibenzothiophenes (DBT) with the increased boiling point and difficulty to remove in that order. Dimethylbenzothiophene and trimethylbenzothiophene are the two major sulfur compounds in military jet fuels. Alkyl-substituted BT and DBT are typically called "refractory" sulfur species because they are more difficult to desulfurize compared to un-substituted counter parts. To avoid sulfur-poisoning, reduction of sulfur in reformate to sub-ppm levels is generally required for SOFC-based generators.

Various desulfurization systems have been developed for integration with liquid fuel based fuel cell systems. These systems generally employ one of the two approaches for sulfur removal: direct organic sulfur absorption (DOSA) or reaction-assisted $H_2S$ adsorption, depending on whether reactions are used to first convert the refractory organic sulfur to more easily absorbed inorganic $H_2S$. Regardless of which approach is employed, a sorbent material is typically used to immobilize the sulfur from the fuel or reformate stream.

However, due to the complexity and the weight of these desulfurization systems, it would be desirable to provide portable desulfurization systems and methods that would be available in a theater of operation and permit fuel cartridges to be filled and refilled from this supply.

SUMMARY

Aspects and advantages of the invention will be set forth in part in the following description, or may be obvious from the description, or may be learned through practice of the invention.

In one aspect, the present subject matter is directed to a system for removing sulfur from liquid hydrocarbon fuel. The system includes a reactor having a fuel inlet and fuel outlet. The fuel inlet and fuel outlet are in fluid communication with a fuel path passing through the reactor. The fuel path is defined by an inner helical thread portion and an outer helical thread portion. The inner helical thread portion is complimentary with and has a smaller diameter than the outer helical thread portion. The inner helical thread portion surrounds a heating element and the outer helical thread portion is surrounded by an outer cover.

In another aspect, the present subject matter is directed to a process for removing sulfur from liquid hydrocarbon fuel. The process includes feeding liquid hydrocarbon fuel into a reactor and contacting the liquid hydrocarbon fuel with a metal oxide sorbent material in the fuel path. The heating element is utilized to raise the temperature of the fuel path such that when the liquid hydrocarbon fuel contacts the metal oxide sorbent material, sulfur is removed effectively from the liquid hydrocarbon fuel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figures 1, 2:
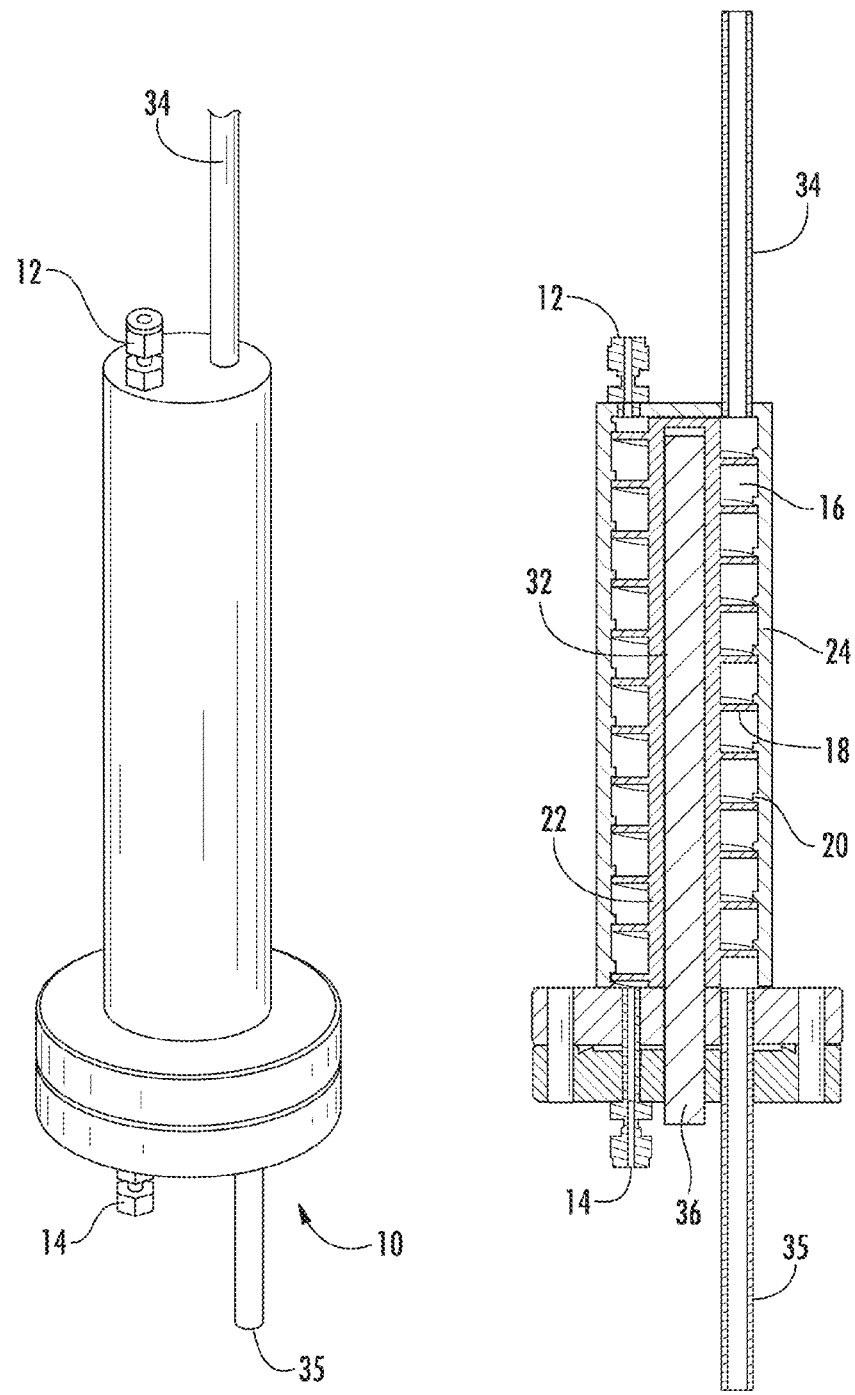
FIG. 1 depicts a side view of an exemplary reactor in accordance with certain aspects of the present disclosure.
FIG. 2 depicts a top cross-section view of an exemplary reactor in accordance with certain aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to systems and methods for liquid fuel desulfurization. In particular, the present disclosure is directed to a reactor having an inner helical thread portion and an outer helical thread portion which come together to form a fuel flow path. The disclosed reactor of the present invention reduces weight, size, and complexity when compared with conventional approaches while also providing the ability for horizontal orientation. In addition, the improved flow path allows for enhanced desulfurization performance. In addition, the present invention provides all directions operation, high L/D (fuel path length L over fuel path cross-section diameter or length) ratio, lightweight and compact volume, and an efficient and re-assemmable design.

Any suitable liquid hydrocarbon fuel can be used in connection with the reactor of the present disclosure. In particular, however, logistic fuels such as diesel, JP-5, JP-8, and the like can be utilized in connection with the described reactor.

Referring to FIG. 1, a desulfurizing reactor 10 in accordance with the present disclosure is illustrated. Reactor 10 has a generally cylindrical shape. Reactor 10 includes fuel inlet 35 and fuel outlet 34. Fuel inlet 35 and fuel outlet 34 define openings into reactor 10 and can include any suitable port to be joined to another length of tubing as would be appreciated by those of ordinary skill in the art.

Reactor 10 and the components described herein can be formed from any suitable material such as metal or the like. Reactor 10 can have a length of from about 0.05 m to about 1.5 m, more particularly from about 0.1 m to about 0.5 m, still more particularly from about 0.15 m to about 0.3 m.

Turning to FIG. 2, fuel inlet 35 and fuel outlet 34 are connected to one another by fuel path 16. The walls of fuel path 16 are generally defined by inner helical thread portion 18 and outer helical thread portion 20. Inner helical thread portion surrounds and forms the outer diameter of core 22. Inner helical thread portion 18 can have an outer diameter of from about 10 mm to about 100 mm, more particularly from about 30 mm to about 50 mm, still more particularly from about 35 mm to about 40 mm. Outer helical thread portion 20 forms part of casing 24, which has an inner diameter that is similar to thread portion 20 (although thread portion 20 can be etched or machined into casing 24 so as to form helical grooves within casing 24). Helical wall 18 can have a thickness of from about 0.3 mm to about 3 mm, more particularly from about 0.5 mm to about 1.5 mm. Helical wall space in between the adjacent two walls is preferably the length of the distance from outer diameter of core 22 to the inner diameter of casting 24, from about 5 mm to about 50 mm, more particularly from about 7 mm to about 30 mm, still more particularly from about 8 mm to about 20 mm.

Figure 3:
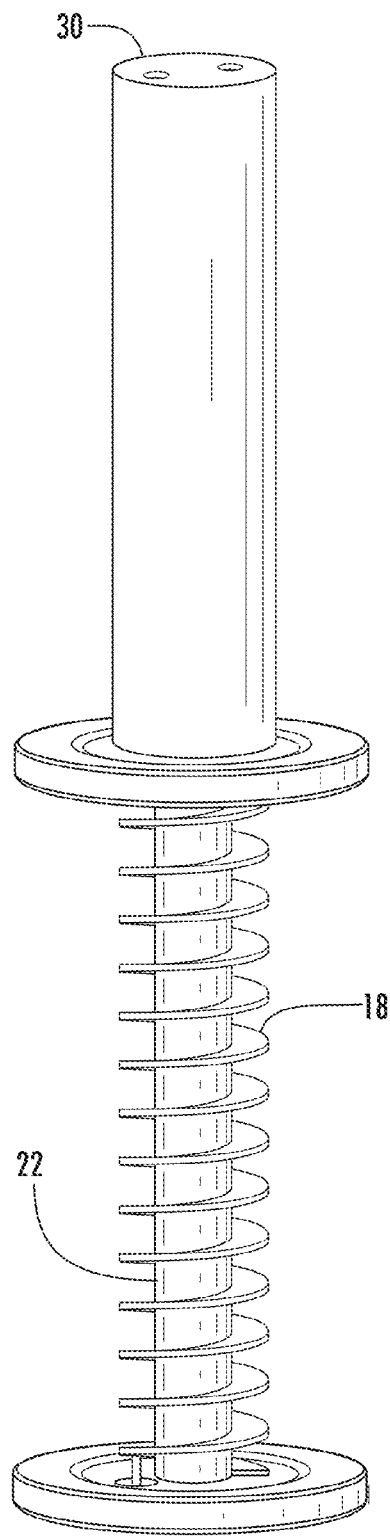
FIGS. 3 and 4 depict exploded views of an exemplary reactor in accordance with certain aspects of the present disclosure.
Figure 4:
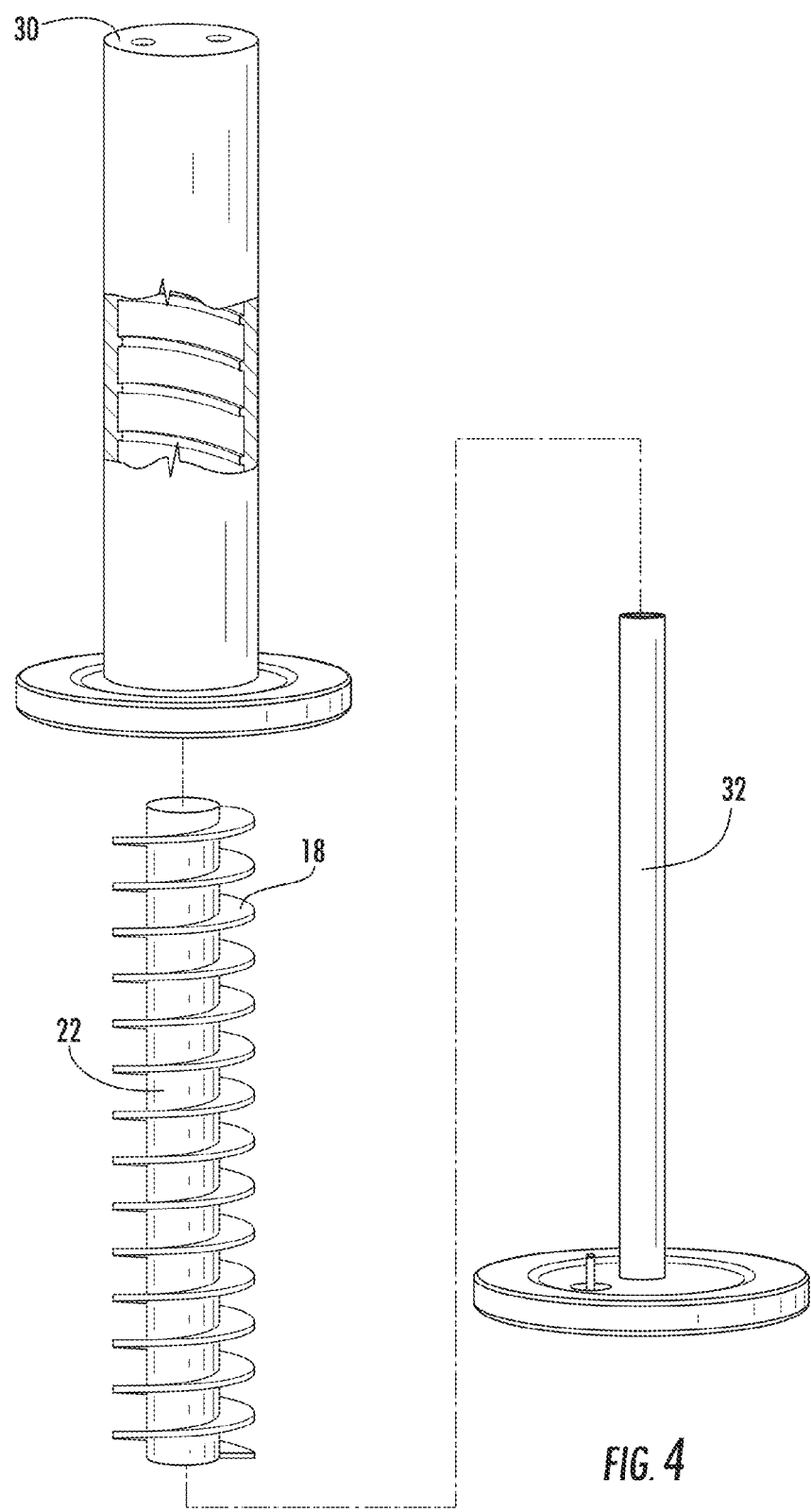
Figure 5:
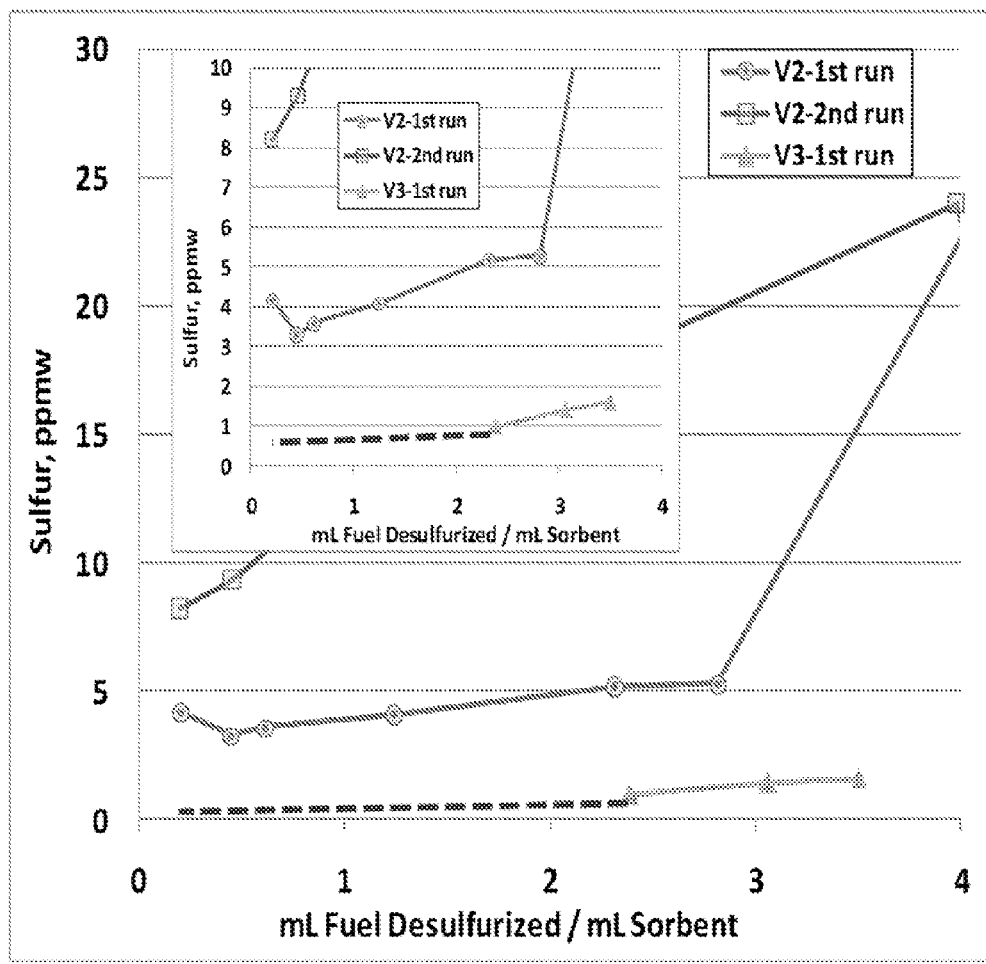
FIG. 5 shows Table 1.

With reference to FIGS. 3 and 4, inner helical thread portion 18 and core 22 can engage first end section 30, particularly heater element 32, such that heater element 32 fits within an opening defined by core 22. Inner helical thread portion 18 can engage outer helical casing 24, particularly outer helical thread portion 20, such that inner helical thread portion 18 can be screwed into outer helical thread portion 20 and press sealed to form reactor 10. The press seal is accomplished by applying force onto the end of the inner helical when screwing the flange bolts. In this manner, fuel path 16 is sealed within casing 24 and inner helical thread portion 18 interlocks with outer helical thread portion 20 to prevent fluid from diverting/seeping from the seals and also allowing de-assembling and re-assembling.

Electric heater element 32 is utilized to provide heat for the reactor and fuel within the reactor to maintain at a desired temperature. Multiple thermocouples can be utilized, for example one at the reactor fuel inlet 12 and one at the outlet 14. The thermocouple at the reactor fuel inlet can be utilized for the heater temperature control and the outlet thermocouple can be utilized to detect/monitor approximate temperature within fuel path 16. Referring again to FIG. 2, the reactor 10 fuel inlet 35 and fuel outlet 34 can also be utilized as gas inlet and gas outlet respectively, which can be utilized for sorbent activation or regeneration. A backpressure check valve can be utilized to control the pressure within reactor 10.

Fuel path 16 includes one or more sorbent materials (not shown) for desulfurizing the liquid fuel that passes therethrough. For example, a regenerable metal oxide sorbent material can be utilized. Regenerable desulfurization agents are capable of removing sulfur from refractory organosulfur compounds. Such desulfurization agents can remove sulfur from refractory organosulfur compounds at moderate temperature and at moderate pressure in the absence of hydrogen and the desulfurization agent can be fully regenerated by exposing it to air at a temperature that is substantially the same as that at which the desulfurization agent removes sulfur from the fuel. While the temperature may not remain precisely static, no active steps are taken to raise or lower the temperature. Without wishing to be bound by any particular theory, it appears that metal or metal oxide species are converted to metal sulfides during desulfurization, and that the metal sulfides are converted back to metal oxide species during the regeneration process. In the presence of a reducing, sulfur-containing gas, the Gibbs free energy of the chemical system is minimized if the metal or metal oxide converts to the corresponding metal sulfide. In the presence of an oxidizing gas, the Gibbs free energy of the chemical system is minimized if the metal sulfide transforms to the corresponding metal oxide.

In accordance with the present disclosure, one suitable metal oxide sorbent material is zinc oxide. For instance, Sulfa-Trap D1™ produced by TDA Research, Inc. can be utilized as a suitable metal oxide sorbent material. The metal oxide sorbent material can be activated before desulfurizing liquid fuel. The activation can be accomplished by flowing mixture of nitrogen and hydrogen (for example, at N2/H2 98/2 ratio) at high temperature (400° C. for example) at ambient pressure for a period of time (>8 hours for example). The main purpose for the activation is to remove oxygen gas from within the reactor and from the absorbent material.

The activation process can be conducted in advance so that the reactor can be pressurized with nitrogen for ready usage.

The system can be designed in batch operation or in continuous operation. In the continuous operation mode, at least two reactors need to be connected in parallel so that before the first reactor is unable to perform, a second reactor can be installed. Once the second reactor is in operation, the first reactor is turned off and replaced with a new reactor. The off line reactors can be refilled or regenerated off line.

In certain embodiments, a filter can be present along fuel path to prevent the sorbent material from exiting the reactor. The filter can be any suitable filter, such as a nickel foam or stainless steel wool.

Referring now to a process for removing sulfur from liquid hydrocarbon fuel, liquid hydrocarbon fuel can be fed into reactor through fuel inlet to travel along fuel path. The liquid hydrocarbon fuel contacts metal oxide sorbent material along at least a portion of the fuel path under adjustable heat and pressure conditions to result in sulfur being removed from the liquid hydrocarbon fuel. For instance, in certain aspects of the present disclosure, the temperature of the fuel path can range from about 100 degrees C. to about 450 degrees C. In certain aspects of the present disclosure, the pressure within the reactor can range from about 50 pounds per square inch to about 200 pounds per square inch. It should be understood that one or more reactors can be operated in parallel and alternated while sorbent material is being replaced and/or regenerated.

The present disclosure can be better understood with reference to the following examples.

EXAMPLES

A 0.1 liter desulfurization reactor was designed and fabricated for batch Army JP-8 treatment. Using desulfurizer as described herein, three batches of sulfur containing Army JP-8 with 700 ppmw sulfur were desulfurized. Twenty-three samples were collected during the three batches of desulfurization, and twenty of the twenty-three samples were analyzed using ASTM D-2622, ASTM D-5453 and ASTM D-4294 methods.

The desulfurizing conditions were as follows: 240° C. at 120 psig, JP-8 flow rate at approximately 1 ml/min. ASTM D5453 test method covers the determination of total sulfur in liquid hydrocarbons, boiling in the range from approximately 25 to 400° C., with viscosities between approximately 0.2 and 20 cSt (mm$^2$/S) at room temperature. FIG. 1 results demonstrate that the effectiveness of the present desulfurizer. The reactor can reduce 99.8% sulfur from 700 ppmw to less than 1 ppmw.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for removing sulfur from liquid hydrocarbon fuel, the system comprising:
    a reactor, the reactor having a fuel inlet and fuel outlet, the fuel inlet and fuel outlet being in fluid communication with a fuel path passing through the reactor, the fuel path being defined by an inner helical thread portion and an outer helical thread portion, the inner helical thread portion being complimentary with and having a smaller diameter than the outer helical thread portion, the inner helical thread portion surrounding a heating element, the outer helical thread portion being surrounded by an outer cover, wherein the fuel path comprises a metal oxide sorbent material which effects the removal of sulfur from a stream of liquid hydrocarbon fuel fed into the fuel inlet.

2. The system of claim 1, wherein the metal oxide sorbent material comprises zinc oxide.

3. The system of claim 1, wherein the sorbent is activated.

4. The system of claim 1, wherein the inner helical thread portion and outer helical thread portion form a seal which prevents fluid from leaking therebetween.

5. The system of claim 1, wherein the liquid hydrocarbon fuel comprises JP-8 fuel.

6. The system of claim 1, wherein the fuel outlet is in fluid communication with a fuel cell through a fuel reformer.

7. The system of claim 1, further comprising a thermocouple in communication with the heating element.

8. The system of claim 1, further comprising a filter material at the fuel outlet.

9. The system of claim 8, wherein the filter material comprises nickel or stainless steel foam.

10. A system for removing sulfur from liquid hydrocarbon fuel, the system comprising:
    a reactor, the reactor having a fuel inlet and fuel outlet, the fuel inlet and fuel outlet being in fluid communication with a fuel path passing through the reactor, the fuel path being defined by an inner helical thread portion and an outer helical thread portion, the inner helical thread portion being complimentary with and having a smaller diameter than the outer helical thread portion, the inner helical thread portion surrounding a heating element, the outer helical thread portion being surrounded by an outer cover, wherein the fuel outlet is in fluid communication with a fuel cell through a fuel reformer.

11. The system of claim 10, wherein the fuel path comprises a metal oxide sorbent material which effects the removal of sulfur from a stream of liquid hydrocarbon fuel fed into the fuel inlet.

12. The system of claim 11, wherein the metal oxide sorbent material comprises zinc oxide.

13. The system of claim 11, wherein the sorbent is activated.

14. The system of claim 11, wherein the inner helical thread portion and outer helical thread portion form a seal which prevents fluid from leaking therebetween.

15. The system of claim 11, wherein the liquid hydrocarbon fuel comprises JP-8 fuel.

16. The system of claim 11, further comprising a thermocouple in communication with the heating element.

17. The system of claim 11, further comprising a filter material at the fuel outlet.

18. The system of claim 17, wherein the filter material comprises nickel or stainless steel foam.

19. A system for removing sulfur from liquid hydrocarbon fuel, the system comprising:
    a reactor, the reactor having a fuel inlet and fuel outlet, the fuel inlet and fuel outlet being in fluid communication with a fuel path passing through the reactor, the fuel path being defined by an inner helical thread portion and an outer helical thread portion, the inner helical thread portion being complimentary with and having a smaller diameter than the outer helical thread portion, the inner helical thread portion surrounding a heating element, the outer helical thread portion being surrounded by an outer cover; and
    a filter material in the fuel outlet.

20. The system of claim 19, wherein the filter material comprises nickel or stainless steel foam.

* * * * *